United States Patent Office 2,725,609
Patented Dec. 6, 1955

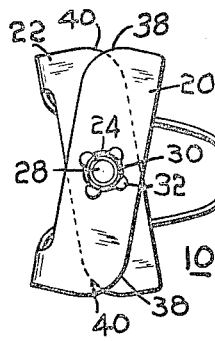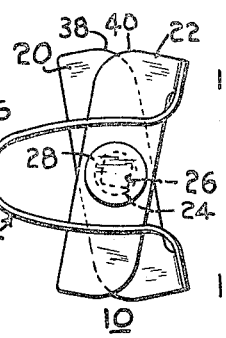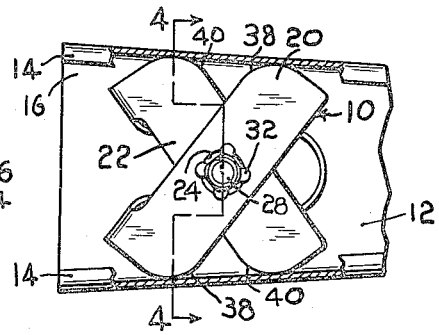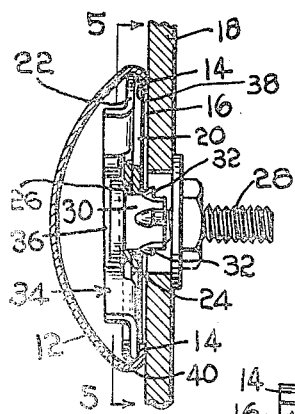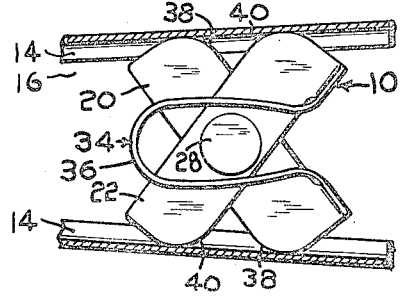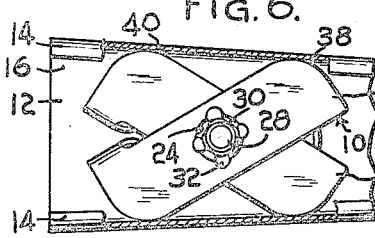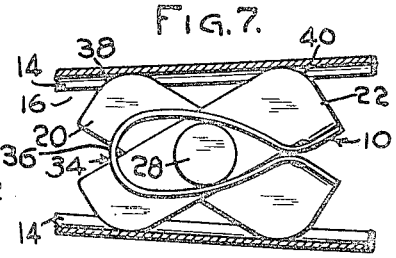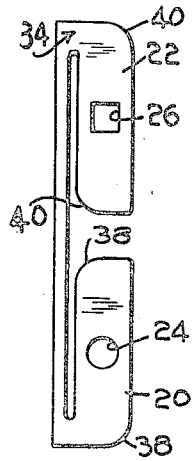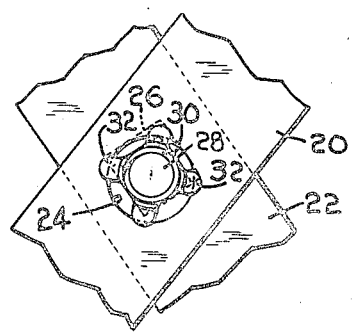

2,725,609

MOLDING FASTENER

Robert E. Ross, Lexington, Mass., assignor, by mesne assignments, to United-Carr Fastener Corporation, Boston, Mass., a corporation of Delaware Application February 16, 1952, Serial No. 271,918

4 Claims. (Cl. 24—73)

This invention relates generally to fastening devices, and has particular reference to a molding fastener for attaching a strip of channeled molding to a support.

In the construction of automobiles and the like, it is common to provide a decorative molding on various parts of the vehicle, which is commonly formed of a strip of sheet metal having inturned edges forming opposing recesses, so that a fastener having a molding-engaging portion for spanning the distance between the recesses may be inserted therein to pass behind the inturned edges. Since many types of moldings in common use are tapered, or otherwise vary in width throughout their length, it has been difficult to provide a molding fastener which will adapt itself to engagement with various width of moldings, and which will have the strength required to firmly retain the molding against the support.

The object of the invention is to provide a high strength molding fastener which is adapted for engagement with moldings of various widths.

A further object of the invention is to provide a molding fastener having a pair of superimposed relatively rotatable cross plates for spanning the molding and spring means associated therewith to bias said plates into a predetermined angular position.

Another object of the invention is to provide a molding fastener in which a pair of superimposed cross plates are relatively rotatable about a bolt member extending therethrough to vary the overall height of the fastener.

Another object of the invention is to provide a molding fastener having a pair of superimposed cross plates which are relatively rotatable about a bolt member, in which at least one of said cross plates is movable laterally in relation to said bolt member.

In the drawing:

Fig. 1 is a front plan view of a molding fastener embodying the features of the invention;

Fig. 2 is a rear view of the molding fastener illustrated in Fig. 1;

Fig. 3 is a plan view of the molding fastener of Fig. 1 assembled into a relatively wide molding;

Fig. 4 is a view in section taken on line 4—4 of Fig. 3 partly in elevation;

Fig. 5 is a view in section taken on line 5—5 of Fig. 4 support not shown;

Fig. 6 is a plan view of the fastener assembled into a relatively narrow molding;

Fig. 7 is a view similar to Fig. 5, showing the rear of the assembled fastener of Fig. 6;

Fig. 8 is an enlarged view of the center portion of the fastener shown in Fig. 3; and Fig. 9 is a plan view of blank from which the fastener is made.

Referring to the drawing, there is illustrated a molding fastener 10, which is adapted for assembly into a molding 12 of the type having inturned edges 14 forming opposing recesses 16, to enable the molding to be attached to a support 18.

The fastener 10 comprises a molding engaging portion formed by superimposed front and rear cross plates 20 and 22 respectively, having aligned openings 24 and 26 respectively, through which a bolt 28 is disposed. The bolt 28 is provided with a square shank portion 30 which serves as an axle about which the plates are rotatable relative to each other. The opening 26 in the rear plate is square to conform to the shape of the square shank portion 30 of the bolt, so that the bolt and the rear plate are relatively non-rotatable for a purpose to appear hereinafter. The opening 24 in the front plate 20 is circular so that the front plate is rotatable in relation to the bolt and the rear plate. To retain the bolt in assembly with the plates, staked portions 32 are provided on the square shank portion in front of the front plate. In the illustrated embodiment both openings are made slightly larger than necessary, so that both plates are capable of a small amount of shifting laterally in relation to the bolt, for a purpose to appear hereinafter.

The plates 20 and 22 are normally disposed at a slight angle to each other as illustrated in Fig. 1, in which position the overall height of the molding engaging portion, that is the overall distance between the opposite ends of the plates, is as great as possible. It will be readily seen that as the plates are rotated about the bolt to increase the angle between adjacent upper and lower portions, the overall height of the molding engaging portion is decreased, for a purpose to appear hereinafter. To provide means for urging the plates into the position shown in Fig. 1, that is, where the overall height of the molding engaging portion is a maximum, a spring 34 is provided which is joined to the plates at opposite ends thereof of corresponding sides. The spring 34 is preferably flat in cross section, with the flat side being disposed substantially perpendicular to the plane of the plates, and is provided with a generally U-shaped medial portion 36 which extends behind the plates, the plane of the U-shaped portion being generally parallel to the plane of the plates.

The plates 20 and 22 are provided with diagonally opposite rounded portions 38 and 40 respectively, so that when said plates are rotated to decrease the height of the molding engaging portion, said rounded portions are outermost for entering the recesses 16 of the molding.

To assemble the fastener into a molding, the opposite ends of the plate are squeezed with the fingers until the overall height of the molding engaging portion is less than the distance between the inturned edges of the portion of the molding into which the fastener is to be inserted, thereby flexing the U-shaped portion 36 of the spring 34. The fastener may then be inserted into the molding and released, so that under the biasing force of the spring, tending to return the plates to their normal angular position, the rounded portions of the plates bear against the bottom of the recesses of the molding, and are disposed behind the inturned edges 14 to retain the fastener in the molding. After such assembly, the fastener is movable longitudinally in the molding, but frictionally engages the molding with sufficient force to prevent unintentional movement thereof.

When the fastener is assembled into a tapered molding, it is evident that the width of the molding will be greater on one side of the fastener than on the other. For example, in Fig. 3 the tapered molding is wider on the right side of the fastener than it is on the left side. The provision of the enlarged openings in the plates permits a small amount of lateral shifting of the plates in relation to the bolt, so that the length of the portions of the plates on each side of the bolt may be varied. This enables the distance between the opposite plate ends on one side of the bolt to be slightly greater than on the other side. For example, in Fig. 3 the plates have been shifted in relation to the bolt so that the distance between the opposite plate ends on the right side of the bolt is greater than the distance between the opposite plate ends on the left side of the bolt, thereby allowing the fastener to conform to the taper of the molding so that all four plate ends seat in the bottom of the molding recesses.

If it is desired to slide the fastener longitudinally in a molding of varying width, the plates are free to rotate to accommodate the change in width, while continuously maintaining the frictional engagement with the molding. An important advantage of the present invention is that the fastener may be moved longitudinally in the molding in either direction without binding therein.

After a suitable number of the fasteners have been assembled into the molding, the molding may be assembled with the support by inserting the bolts through suitable openings therein and retained thereon in the usual manner by nuts. During assembly of a nut onto the bolt, the bolt is kept from rotating by the plate 22 in which it is non-rotatably assembled, and rotation of the plate 22 is prevented by its inclined position in the molding.

The particular fastener herein illustrated and described may be rapidly and cheaply formed on an automatic machine from a continuous strip of sheet metal with a minimum of waste metal, since the fastener may be formed from a blank having the shape illustrated in Fig. 8. It is seen that the two plates may be formed from a strip of metal having a width only slightly greater than the width of the plate desired, and the spring may be formed from material taken from alongside the plates and extending throughout the length thereof.

The invention is not limited to fasteners formed of a single piece of sheet metal, since in some cases the plates may be entirely separate, with non-integral spring means assembled therewith. It will also be understood that other means than a bolt may be provided for engagement with the support.

Since certain other obvious modifications may be made in the device without departing from the scope of the invention, it is intended that all matter contained herein be interpreted in an illustrative and not in a limiting sense.

I claim:

1. A fastening device for assembly into a molding having inturned edges forming opposing recesses, said device comprising a molding engaging portion formed by a pair of superimposed cross plates having aligned openings, axle means disposed in said openings, said plates being rotatable in relation to each other about said axle means, one of said plates being shiftable laterally in relation to said axle means, and spring means connected to each of said plates biasing said plates into a predetermined angular relationship such that the overall height of the molding engaging portion is substantially as great as possible.

2. A fastening device for assembly into a molding having inturned edges forming opposing recesses, said device comprising a molding engaging portion formed by a pair of superimposed cross plates having aligned openings, axle means disposed in said openings, said axle means being rotatably disposed in the opening of one of said plates and non-rotatably disposed in the opening of the other of said plates, each of said plates being slightly shiftable laterally in relation to said axle means, and spring means connected to each of said plates biasing said plates into a predetermined angular relationship such that the overall height of the molding engaging portion is substantially as great as possible.

3. A molding fastener comprising superimposed front and rear elongated cross plates having aligned centrally disposed openings, a bolt disposed through said openings and protruding from the front plate, said bolt being rotatably disposed in the opening in one plate and non-rotatably disposed in the opening in the other plate, said plates being normally disposed at a slight angle to each other and being relatively rotatable to increase the angle therebetween, and a flat spring connecting said plates, said spring extending from adjacent sides of the ends of said plates which are opposite each other when the plates are in their normal position, and said spring having a medial portion which extends behind the plates in a generally U-shaped configuration, said spring tending to bias the plates into their normal position.

4. A molding fastener comprising superimposed front and rear elongated cross plates, fastener means pivotally connecting said cross plates at a point centrally disposed with respect to the opposite ends of said cross plates, said fastener means being rotatably connected to one plate and non-rotatably connected to the other plate, said plates being normally disposed at a slight angle to each other and being relatively rotatable to increase the angle therebetween, said pivotally connecting fastener means including a portion extending outwardly from one of said plates for attaching the molding fastener to a support, and a spring connecting said plates, said spring extending from adjacent sides of the ends of said plates, which are opposite each other when the plates are in their normal position, said spring having a medial portion which extends behind the plates in a generally U-shaped configuration, and said spring tending to bias the plates into their normal position.

References Cited in the file of this patent

UNITED STATES PATENTS

| | | |
|---|---|---|
| 1,396,279 | Paine | Nov. 3, 1921 |
| 2,124,252 | Lavigne | July 19, 1938 |
| 2,515,895 | Poupitch | July 18, 1950 |
| 2,531,348 | Amesbury | Nov. 21, 1950 |

FOREIGN PATENTS

| | | |
|---|---|---|
| 44,272 | Denmark | June 29, 1931 |